G. R. WELKE.
ISTLE-MACHINE.
No. 171,708. 3 Sheets—Sheet 1.
Patented Jan. 4, 1876.
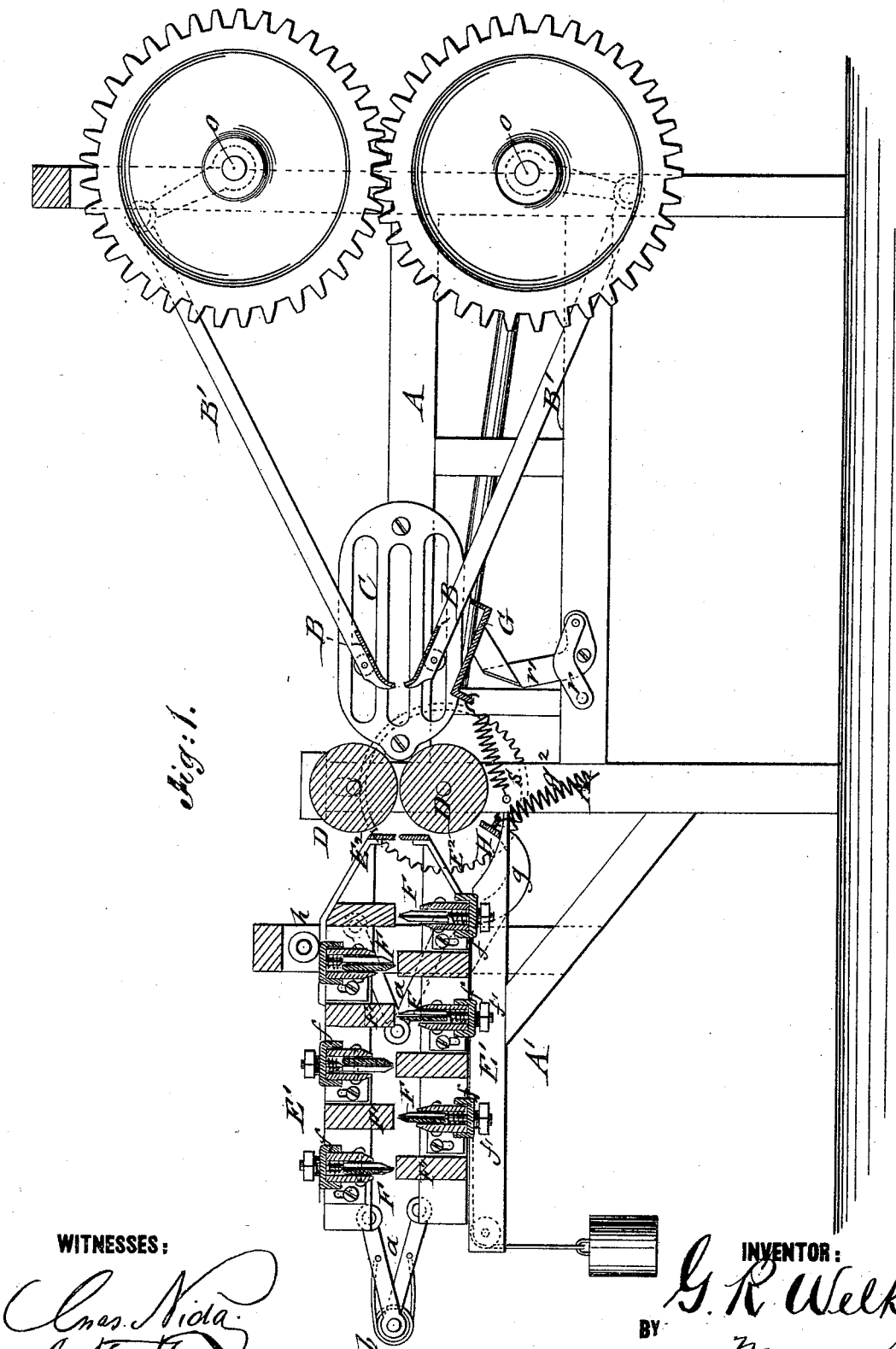
WITNESSES:
INVENTOR: G. R. Welke
BY
ATTORNEYS 3 Sheets—Sheet 2.
G. R. WELKE.
ISTLE-MACHINE.
No. 171,708. Patented Jan. 4, 1876.
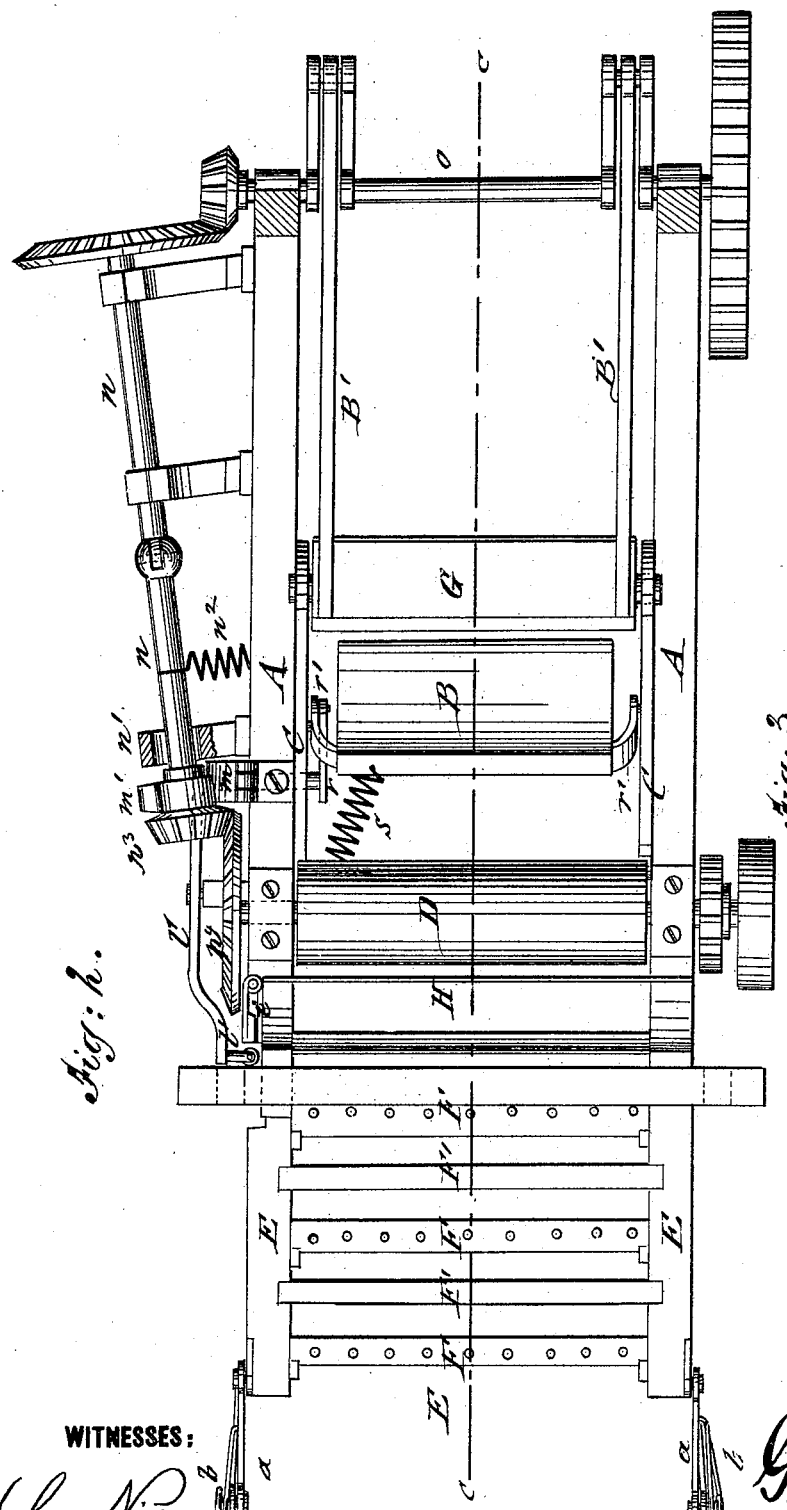
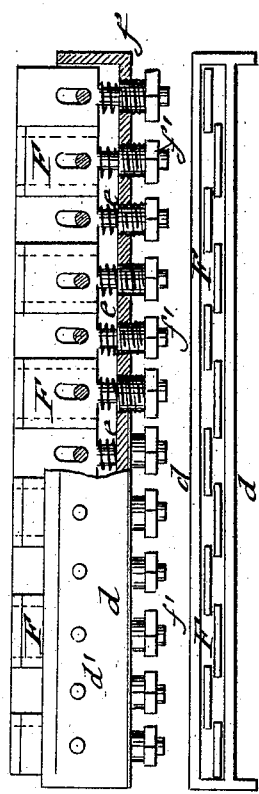
WITNESSES:
INVENTOR:
G. R. Welke
BY
ATTORNEYS.
N. PETERS, PHOTO-LITHOGRAPHER, WASHINGTON, D.C.

3 Sheets—Sheet 3.
G. R. WELKE.
ISTLE-MACHINE.
No. 171,708. Patented Jan. 4, 1876.
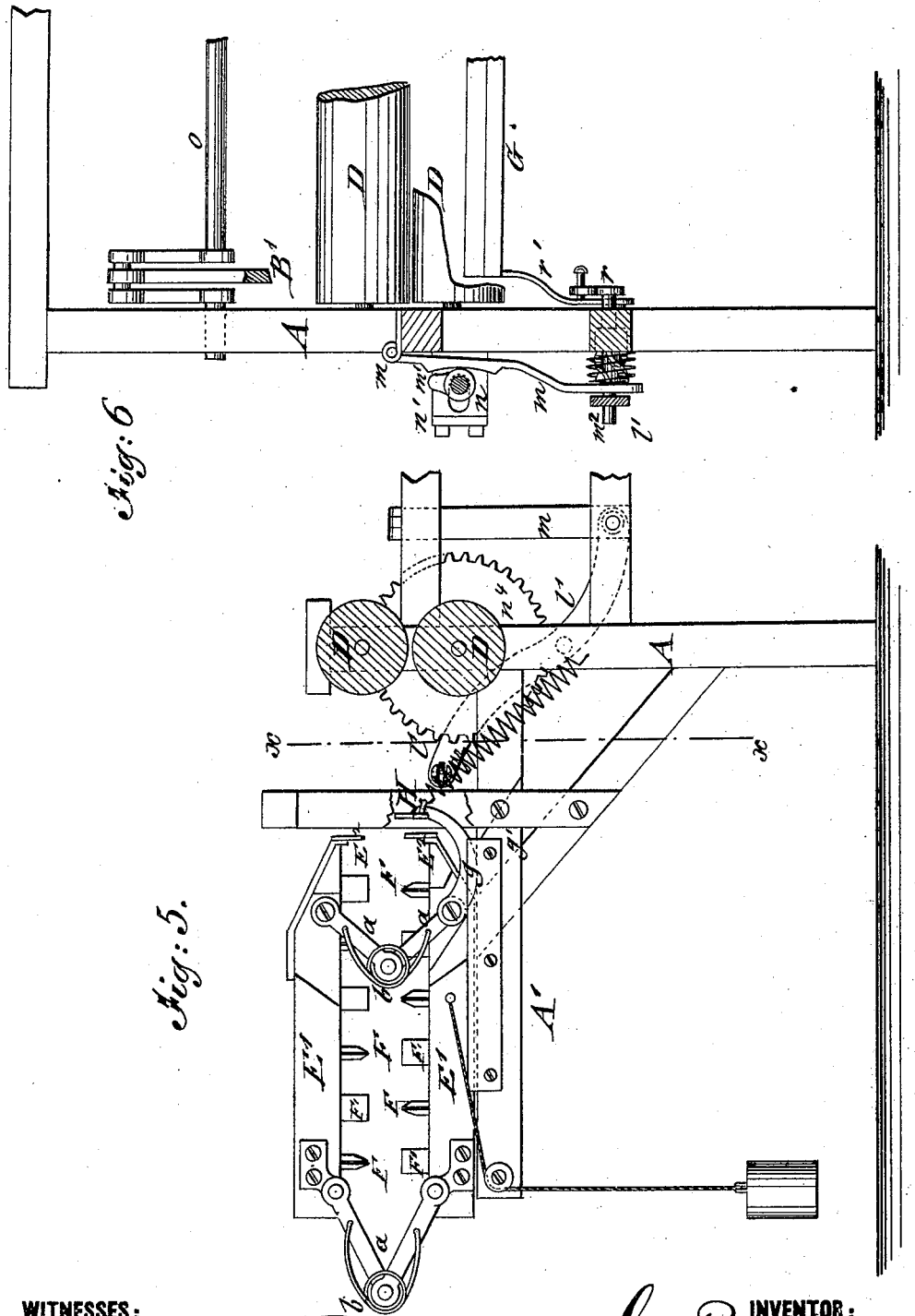
WITNESSES:
INVENTOR:
G. R. Welke
BY
ATTORNEYS.

UNITED STATES PATENT OFFICE.

GUILLERMO ROBERTO WELKE, OF PARRAS DE LA FUENTO, MEXICO.

IMPROVEMENT IN ISTLE-MACHINES.

Specification forming part of Letters Patent No. 171,708, dated January 4, 1876; application filed September 4, 1875.

*To all whom it may concern:*

Be it known that I, GUILLERMO R. WELKE, of Parras de la fuento, in the State of Coahuila and Republic of Mexico, have invented a new and Improved Machine for Making Istle, of which the following is a specification:

The object of this invention is to produce an improved machine for making "istle," or the fiber of the "lechugilla," which is applied in Mexico to the manufacture of a large number of articles, as hammocks, sacks, ropes, nets, cotton bagging, wagon-sheets, carpets, and similar objects.

The istle is consumed in immense quantities, and hitherto obtained from the leaves of lechugilla, which are scraped by hand.

My machine is intended to facilitate the slow and primitive process of obtaining the fiber by hand-scraping, so that the istle may be produced in a more rapid and economical manner.

The invention consists mainly of devices for scraping the leaves, while being drawn by rollers through the scraping-knives, which are made to yield to the thickness of the leaves. The leaves are placed between the scrapers up to a gage-piece, and then carried with the scrapers toward the feeding-rollers. Sliding and reciprocating scraper-jaws are operated by suitable transmitting mechanism, by the forward motion of the scraper-frame, for scraping off the ends of the leaves which are conveyed to a receiving-platform, and dropped by the same to a receptacle below.

In the accompanying drawing, Figure 1 represents a vertical longitudinal section of my improved machine for making istle, on the lines $c\,c$, Fig. 2. Fig. 2 is a top view of the same. Figs. 3 and 4 are, respectively, detail side and top views of the scraping-knives, a part being broken off to show their mode of adjustment. Fig. 5 is a side elevation of the main scraper-frame in open position to take up the leaves of the lechugilla; and Fig. 6 is a vertical transverse section of the machine, on the line $x\,x$, Fig. 5, to show mechanism for dropping the receiving-platform back of the draw-rolls.

Similar letters of reference indicate corresponding parts.

A represents the supporting-frame of my improved machine for treating the leaves of the lechugilla, and producing the fiber of the same. At about the middle part of frame A are arranged the plain or fluted rollers D, which draw the leaves to be scraped through the scraper-frame E, and feed them to the reciprocating scraping-jaws B back of the rollers. The jaws B slide separately in slotted guide-pieces C, and are operated to open and close by crank-rods B'. The draw-rollers D are revolved at suitable speed by crank, belt, and pulley, or otherwise, the upper one being adjustable in the slotted standards by springs and set-screws, to the thickness of the leaves, and the degree of tension required. The scraper-frame E is placed on an extension, A', in front of the rollers D, and guided on friction-rollers with balance-weights, or otherwise in suitable manner, to be easily carried against the rollers and back again for supplying the leaves. The scraper-frame E is made of an upper and lower section, E¹, which are connected by toggle-levers $a$ with spiral springs $b$ acting thereon, so that the upper section is raised as soon as the pressure on the same is discontinued. The front toggle-levers are longer, to throw the front end of the upper section high up, so that the introduction of the leaves is facilitated. Each scraper section is made of side pieces with lateral scraping-knives F and wooden blocks F', which alternate in such a manner that the scraping-knives of the upper section bear against blocks of the lower, and the knives of the lower section against blocks of the upper section, as shown in Figs. 1 and 5.

The scraping-knives F are made of a series of slotted blades, which are arranged so as to alternately overlap each other, and are guided between outer side plates $d$ by connecting-bolt $d'$. The blades are acted upon by spiral springs $e$ placed between the shoulders of the blades and the inclosing casing $f$, which is provided with hollow screw-nuts $f'$, to adjust the tension of the springs. The blades are thus enabled to yield to the varying thickness of the leaves when the same are drawn through the scraper-knives.

The leaves are placed sidewise to each other on the lower scraper section, and pushed against a guard or gage plate, H, that extends laterally across frame A' between scraper-frame E and the draw-rollers D, the gage-plate being at such distance from the end jaws or plates of the frame E that on moving the same forward toward the rollers the ends are taken hold of by the same and the leaves drawn through the scraper-knives. The gage-plate H is applied to pivoted lever-arms $g$ that drop along inclined recesses $g^1$ of frame A' simultaneously with the forward motion of the scraper-frame. A spiral spring, $g^2$, attached to the gage-plate assists in the downward motion, and throws the gage out of the way, producing thereby the unobstructed feeding of the leaves to the rollers. The end of the scraper-frame E is made with inclined jaws $E^2$, that extend toward the rollers and take hold of the leaf ends on the dropping of the gage-plate to feed them to the rollers. The jaws taper down to such width that they may pass near enough to the rollers to secure the regular feeding of the leaves.

The inclined side pieces are acted upon by top rollers $h$, which force, during the forward motion of the scraper-frame, the upper section down, so that instantly on the taking hold of the leaf ends by the rollers the scraping action of the knives throughout the scraping-frame begins, it being continued until the leaves have passed through the rollers.

As the scraping operation has to be accomplished by moistening the leaves, suitable sprinkling devices are employed to furnish the required quantity of water.

The forward motion of the scraper-frame E engages, by a side lug, $i$, the friction-roller $l$ of a fulcrumed lever, $l'$, that presses with its lower end on a bar, $m$, which is hinged at its upper end to frame A, and slides with its slotted and spring-acted lower end on a pin, $m^2$. The hinged bar $m$ is carried by lever $l'$ toward frame A, so as to release a shaft, $n$, that slides in a slotted socket or collar, $n^1$, and is acted upon by a spring, $n^2$. The shaft $n$ is made of two pieces linked together by ball or socket joint, or otherwise, to admit the swinging of the end, and the throwing into gear of a bevel-pinion, $n^3$, with a bevel-wheel, $n^4$, of the lower draw-roller. A bevel-gearing at the opposite end of shaft $n$ transmits motion to a lower and upper crank-shaft, $o$, to which the crank-rods B' of the scraper-jaws B are connected. The forward motion of the scraper-frame produces thereby the rapid action of the scraper-jaws B at the moment when the ends of the leaves pass through the rollers, so that the jaws scrape quickly the crushed ends of the leaves, the scraping action being continued only long enough to produce the complete scraping of the ends of the leaves.

The scraping action of the jaws is interrupted on the completion of the revolution of shaft $n$ by a lug or projection, $m^1$, of the same coming in contact with the hinged bar $m$, so that the pinion $n^3$ is thrown out of gear. When the leaves have passed through the rollers the frame E is withdrawn, and a new set of leaves inserted, and this operation is continued in the same manner.

The fiber or istle, thus freed by the scrapers from the adhering organic matter, is dropped on the platfrom G immediately below the reciprocating jaws B, which platform is also tilted by the forward motion of the scraper-frame E as the fulcrumed lever $l'$ presses, simultaneously with the release of the bar $m$, on a twisted portion of pin $m^2$, causing it to turn in its socket and act by a lever-arm, $r$, on the fulcrumed elbow-shaped supports $r'$ of platform G. A spiral spring, $s$, attached to platform and frame carries this platform instantly back, after dropping the fiber into a suitable receptacle below.

I do not confine myself to the special arrangement of the mechanism for transmitting motion to the scraper jaws and the tilting platform, as the same effect may be produced in different manner, this construction being merely shown to explain the connection of the scraper-frame and revolving rollers with the parts requiring intermittent motion.

Having thus described my invention, I claim as new and desire to secure by Letters Patent—

1. The sliding scraper-frame E, made of an upper and lower section, $E^1$, which are connected by toggle-levers $a$ and springs $b$, and constructed of alternating scraper-knives F and blocks F' that act jointly on the interposed leaves, substantially in the manner specified.

2. The scraping-knife F of the scraper-frame, made of a series of alternately overlapping blades, which are guided and yield to adjust themselves to the thickness of the leaves, substantially as described.

3. The scraper-frame herein described, provided with a swinging and spring gage-plate, H, to secure position of leaves and drop out of the way on forward motion of frame, as set forth.

4. The sliding scraper-frame E, having inclined end jaws in combination with the top rollers $h$, which compress the scraper sections $E^1$, and feed leaves to draw-rollers $g$, substantially as described.

The above specification of my invention signed by me this 17th day of May, 1875.

GUILLERMO ROBERTO WELKE.

Witnesses:
Y. GALINDO,
WILLIAM KOENZ.